United States Patent [19]
Chan

[11] Patent Number: 5,116,273
[45] Date of Patent: May 26, 1992

[54] SELF-EXTENDING PORTABLE PANELS

[76] Inventor: David S. Chan, 8 Argonne Crescent, Willowdale, Ontario, Canada, M2K 2K1

[21] Appl. No.: 691,816

[22] Filed: Apr. 26, 1991

[51] Int. Cl.[5] .............................................. B60J 3/00
[52] U.S. Cl. .................................. 160/370.2; 160/387
[58] Field of Search .................. 160/370.2, 127, 128, 160/237, 377, 351, 369, 387; 296/97.7, 97.8

[56] References Cited

U.S. PATENT DOCUMENTS

| 1,217,932 | 3/1917 | Fitzgerald | 160/377 |
| 1,378,904 | 5/1921 | Schuermann | 160/377 X |
| 1,475,647 | 11/1923 | Naterman | 160/370.2 X |
| 4,815,784 | 3/1989 | Zheng | 160/370.2 |
| 5,024,262 | 6/1991 | Huang | 160/370.2 |

Primary Examiner—David M. Purol

[57] ABSTRACT

A self extending storable panel formed of cloth or flexible plastic, with a circular perimeter sleeve, and a spring wire hoop in the sleeve which can be twisted for storage and will extend itself into a hoop in use. Tabs may be attached to the panels for hanging the panels where required.

5 Claims, 2 Drawing Sheets

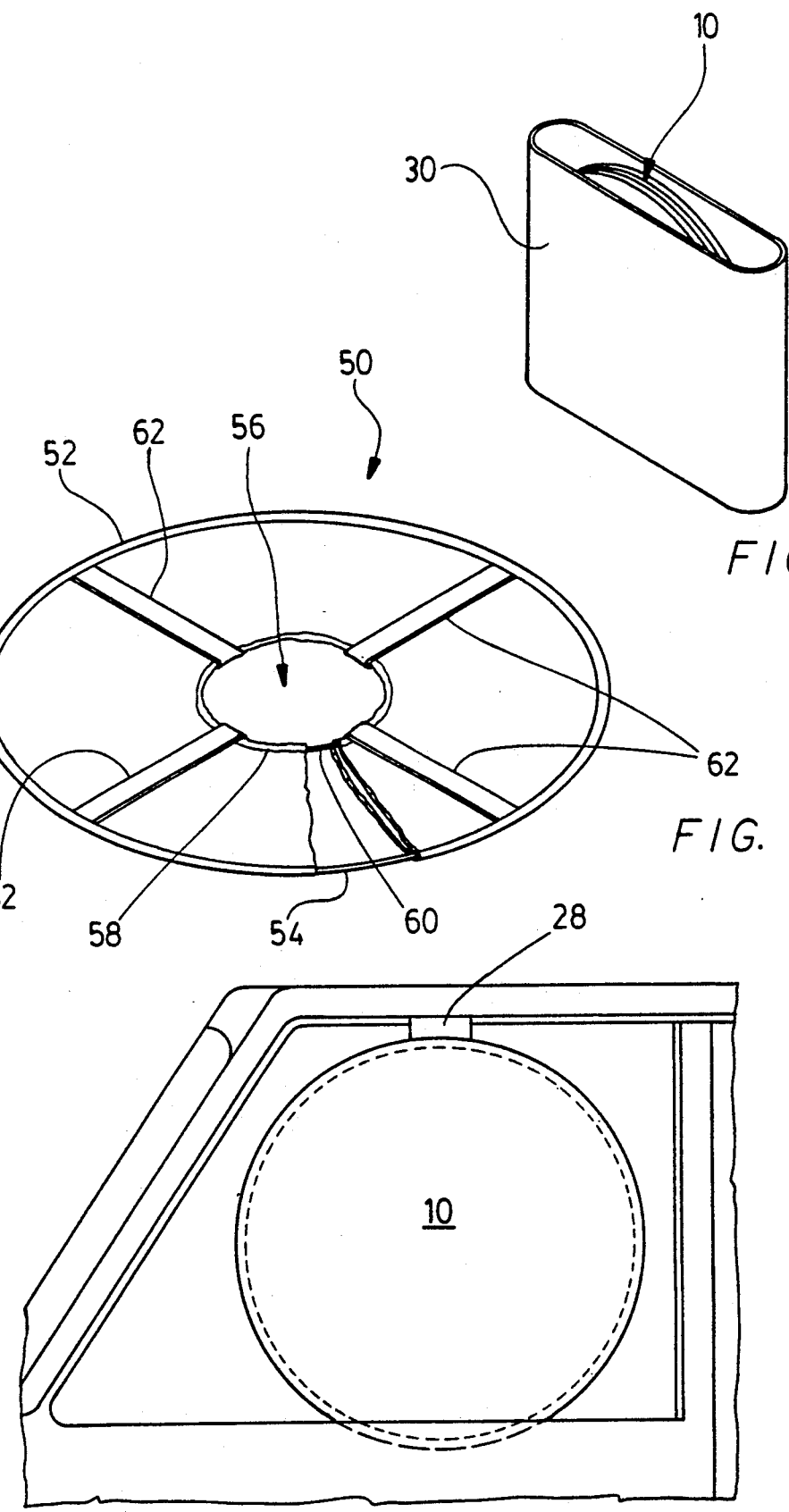

SELF-EXTENDING PORTABLE PANELS

FIELD OF THE INVENTION

The invention relates to storable panels of the type which are self extending and can be quickly set up and used as screens, displays or protective purposes, and in particular to such panels which are both self extending and storable for lengthy periods of time.

BACKGROUND OF THE INVENTION

There are many situations in which it is desirable to have available a form of portable temporary screen or display consisting of one or more panels, for a variety of purposes. For example, such displays have been advantageously used at sporting events, political conventions, and advertising displays at trade shows. Another example, is the erection of a temporary sun or wind screen, such as inside an automobile, the top of the dashboard panel in the front of the automobile or on a beach. Other storable, portable, panels may be required by hunters, as portable blinds. Another use is for example as food serving trays on picnics.

The other uses for such panels are in the collection of debris or the protection of clothing, for example, in the case of a hair dressing salon, or a make-up studio. In all of these situations, there may be a requirement for such a panel which can be extended to cover a substantial area, and which yet can readily be folded into a compact volume, so that it may be packaged and put away in a convenient pouch when not in use.

Such panels may also be used for recreational purposes. For example, they may be thrown like any other circular flat object, and they will soar through the air in a somewhat erratic unpredictable manner, to provide a form of game for the beach or in a park.

In the past, various forms of panel systems have been proposed. For example, sunscreen panels have been provided for the interior of a vehicle. These are usually simply sheets of paper board material which are folded in such a way that when they are unfolded into an extended condition, they can be stood upright on the dash panel. These systems are reasonably effective and have the advantage that they may carry some form of printing or graphics, which is then displayed through the front windshield. Thus such panels are suitable as promotional media. Consequently, they can usually be produced with at least a major portion of the cost covered by an advertiser, so that the actual cost of the screen itself to the end user can be reduced to a minimum.

However, these systems are relatively clumsy and do not fold into a compact easily storable package.

Another form of self-extending sun screen panel is shown in U.S. Pat. No. 4,815,784.

In this patent, a sun shield for example for the front windshield of an automobile, when it is parked, is provided by means of a generally rectangular panel of material, with two spring wire hoops for supports. The spring wire hoops extend parts of the panel, so that it substantially fills the windshield. Between the two hoops the panel is joined by a hinged portion, and the panel may be folded around the hinged portion.

This particular system, while being effective for the particular purpose for which it is designed, is of somewhat restricted utility. It is essentially applicable only to the blocking of the sun's rays from passing through an automobile windshield, and is not adaptable to other purposes.

Folding panels of rigid material are, generally speaking, not suitable for use as storable self extending display panels such as may be used at sporting events or political conventions or the like. They do not lend themselves readily to be carried on the person, and are clumsy to use. In the past, spectators of sporting events wishing to make a visual demonstration have usually been restricted to simply displaying a large panel of cloth which must usually be held out in its extended form by four or six people. Obviously, systems of this type are not satisfactory since they obstruct the view of other spectators, and are unlikely to be tolerated for any length of time. In political conventions, the usual type of display panel involves one or two pieces of paper board fastened to a wooden stick. Again, these systems are clumsily and likely to lead to injury unless carefully handled, and are also easily broken. Secondly, they are not in any way collapsible, and cannot be carried on the person in a folded or stored condition.

BRIEF SUMMARY OF THE INVENTION

With a view, therefore, to providing a self extending storable panel, overcoming the various disadvantages noted above, the invention comprises at least a panel portion formed of flexible material and defining a circular perimeter of predetermined diameter, a perimeter sleeve formed around said panel portion having a diameter greater than said panel portion, said sleeve being attached around the perimeter of said panel portion in such a fashion that when said sleeve is extended, it will apply substantially equal tension to said panel portion all the way around said perimeter, a spring metal ring hoop located in said sleeve, said hoop being dimensioned to have a diameter greater than said panel portion so as to extend and stretch said panel portion, said spring hoop being resiliently collapsible, in loops, into at least two adjacent connected smaller hoops, whereby said panel may thus be collapsed, for storage, said ring hoop being resiliently self extendable when released, whereby to spring out to its maximum diameter, thereby tensioning said panel portion in a substantially equalized fashion around its entire perimeter.

The invention further comprises a self extending storable panel including a tab portion on said panel, secured to said perimeter, whereby said panel may be suspended.

The invention further provides a self-extending storable panel wherein said panel comprises a circular disk of woven material comprising threads interwoven at right angles to one another, and wherein said perimeter sleeve is formed of woven material, said woven material being cut in a bias fashion, thereby defining threads running diagonally from one edge to the other of said perimeter sleeve and intersecting one another at right angles.

The invention further comprises such a self-extending storable panel wherein said perimeter sleeve is sewn to the perimeter of said disk along a first annular seam, spaced predetermined distance from said circular perimeter of said disk, with one edge portion of said sleeve extending towards said circular perimeter, and the other edge portion of said sleeve extending inwardly away from said circular perimeter, and said sleeve being folded adjacent to said first annular seam, so as to extend around said circular perimeter of said panel portion, and said second edge of said sleeve being sewn along a second annular sewing line to said panel, said second annular sewing line being located radially inwardly of said first sewing line.

The invention further comprises a self-extending storable panel of the type described and wherein said spring metal ring hoop is defined by a continuous elongated strip of spring steel, said strip defining a rectangular cross section having outer and inner surfaces of a predetermined first length L and having inner and outer edges having a predetermined second length l wherein l is smaller than L, whereby to define a generally flattened rectangular cross section, having two free ends and including sleeve means folded around said free ends, and secured thereto, whereby to secure said band into a ring hoop shape.

Such panels may be of plastic sheet or web material, or fabric. They may be printed with graphics, or a message, or simply an attractive design.

The various features of novelty which characterize the invention are pointed out with more particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

IN THE DRAWINGS

FIG. 5 is a perspective illustration of the folded panel of FIG. 4, shown stored in a pouch;

FIG. 6 illustrates the use of the invention in one mode, and,

FIG. 7 is a perspective illustration of an alternate embodiment.

DESCRIPTION OF A SPECIFIC EMBODIMENT

Figure 1:
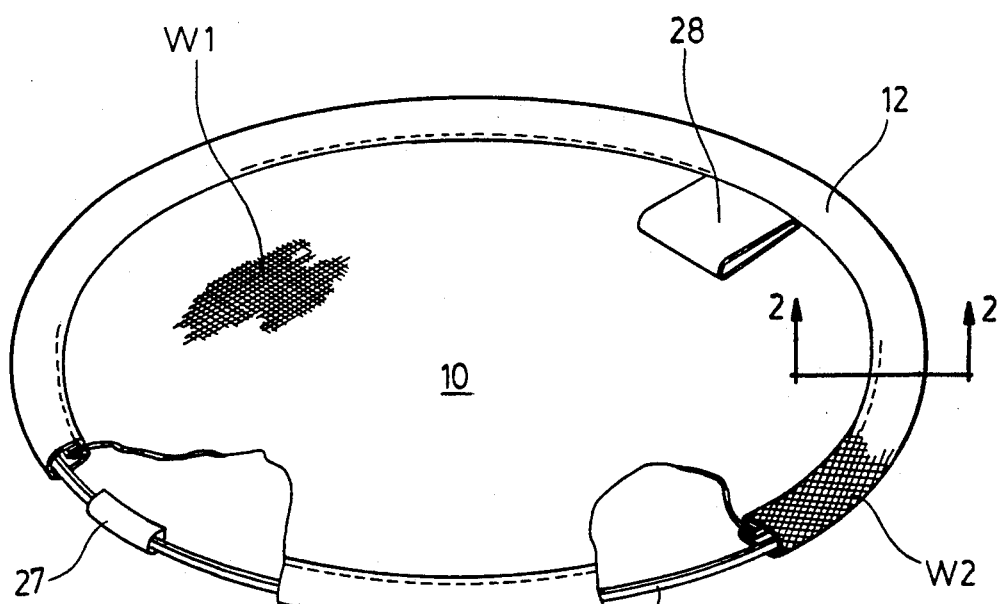
FIG. 1 is a perspective front illustration of a self extending storable panel shown in its extended condition and shown partially cut away.

Referring first of all to FIG. 1, it will be seen that this embodiment of the invention relates to a form of storable panel screen, which is particularly adapted for use as a portable display for graphics or a message or the like. However, the use of the invention is not to be considered as exclusively confined to such an application, but it may be employed in a variety of situations where some form of temporary portable display or screen is required.

As shown in FIG. 1, the invention there illustrated comprises circular panel 10. Panel 10 is circular and has at its perimeter a sleeve 12 formed therearound. The panel 10 in this particular case has a predetermined diameter and is formed of cloth material typically being cotton, so that it may easily be folded up, and extended for use, and refolded many times and thus may have a lengthy useful life, and may be cleaned as desired. Materials other than cloth, such as flexible thermoplastic, may also be used. The sleeve 12 has a diameter greater than that of the panel portion 10.

Within the sleeve 12, there is located a wire ring or hoop 14. The wire hoop is typically made of spring steel material, and also has a diameter greater than the panel 10. Hoop 14 is resiliently flexible, and may be twisted into various shapes and will spring back into its extended hoop shape as shown.

The diameter of the hoop or ring 14 is larger than panel 10 such as to cause the extension of the material of the panel 10 under a reasonable degree of tension so as to maintain the same more or less flat.

The panels 10 may be printed with graphics, or advertising messages, or simply an attractive design.

Panel 10 in this particular embodiment is made up of woven material W1, so that it will have threads intersecting at angles, extending across the panel from one perimeter to the other.

The sleeve 12, however, is made up of a strip of woven material W2 which is cut "on the bias" as explained below. The sleeve 12 is initially an elongated strip of material, having a length slightly longer than the perimeter of the panel 10, and it is cut diagonally from a woven piece of material, so that the woven threads in the strip extend diagonally from one side edge of the strip to the other, intersecting one another at angles where ever they cross as shown at W2 in FIG. 1.

The sleeve 12 is secured to the perimeter of the panel by two separate seams or arcuate lines of sewing 20 and 22 (FIG. 2), around the circular perimeter of the panel 10. The first line of sewing 20 secures one free side edge 24 of the sleeve 12 to one side of the perimeter of panel 10. The side edge 24 is oriented so as to extend towards the perimeter of panel 10, so that the remainder of the sleeve extends inwardly, at this stage.

Figure 2:
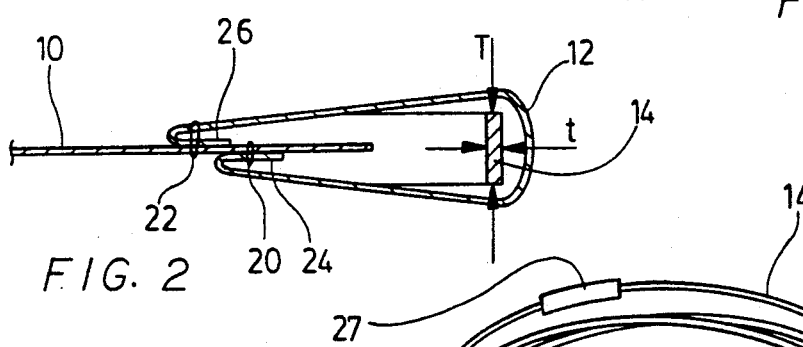
FIG. 2 is a section along line 2—2 of FIG. 1.

The sleeve is then folded outwardly over the first line of sewing 20 and around the edge of the panel 10. The other free edge 26 of sleeve 12 is then unfolded and sewn at the second line of sewing 22 to the opposite side surface of the panel 10. The second line of sewing 22 is formed just radially inwardly of the first line of sewing 20, so that it defines a radius slightly less than the radius defined by the first arcuate line of sewing 20. In this way, the two lines of sewing 20 and 22 are slightly offset from one another radially relative to the centre of the panel, to provide sustantially increased strength. The hoop 14 is made of a spring steel material, having a flattened rectangular cross-section as shown (FIG. 2). The thickness of the material, in the plane of the radial dimension of the panel, has a thickness t. The thickness of the strip in a direction normal to the plane of the panel has a thickness T, where T is larger than t.

Such a spring steel strip is formed into a hoop, by means of a substantially rigid junction sleeve 27, which is formed and stamped around the two ends of the strips, so as to hold them securely in a circular hooplike shape as shown.

The effect of hoops of this flattened rectangular shaped construction, when used in a bias cut woven material, forming the sleeve, is such as to apply equal tension to the sleeve around the perimeter of the panel, thereby stressing and stretching the panel equally in all directions at once. This produces a substantially circular shape, which makes an unusual and highly attractive display panel for displaying graphics information, or advertising material or for any other purpose.

FIG. 1 illustrates the panel 10 in its extended, in-use position.

The wire hoop 14 may be deformable in order to fit any particular space. Thus the wire hoop may simply be squeezed to fit a space available which may be available.

Figure 3:
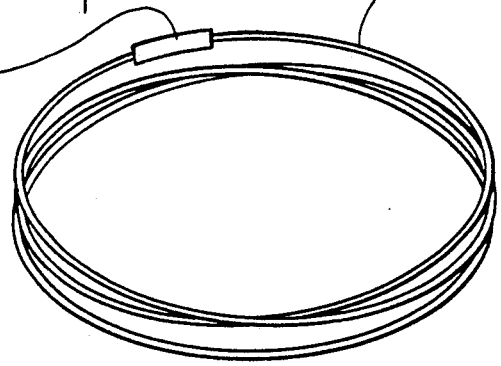
FIG. 3 is a perspective illustration of the spring hoop, in isolation, shown as its stoved position.
Figure 4:
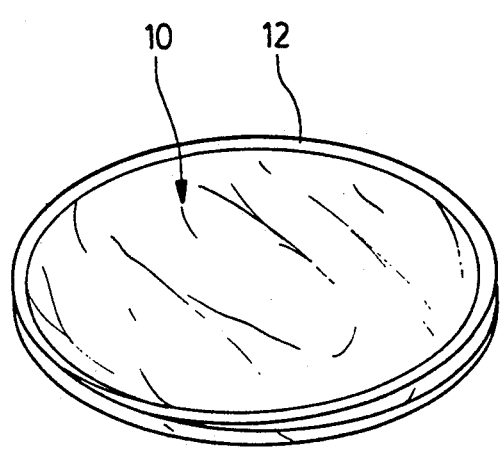
FIG. 4 is a perspective illustration showing the panel collapsed for storage.

When not in use, the panel 10 may be collapsed for storage. This is essentially done by taking hold of the wire hoop 14, in the two hands, at approximately 180 degrees spaced apart around the perimeter of the panel, and then simply twisting the wire hoop into a figure of eight, and folding the two halves of the figure of eight together as shown in FIGS. 3 and 4. In fact, with a little practice, it is possible to collapse the panels 10 so that there are essentially three circular loops of the wire hoop 14, which lie essentially flat one on top of the other in a concertina fashion.

A junction web 28, formed as a loop may be sewn to one or others seam 20. Fastenings such as hooks, crown fastenings, zip fasteners or buttons or the like (not shown) may be secured to web 28, so that adjacent webs may be attached together. Other forms of fastenings may be used, for example, Velcro (trademark) interlocking hook and pile material may also be used.

The collapsed panel may then be placed in a pouch 30 illustrated in FIG. 5. This pouch will thus provide a compact and secure method of storage of the panel, and yet will leave the panel instantaneously ready for use at any time it is desired to display it. As soon as the panel is released from the pouch 30, the resilience of the wire hoop 14 will be such as to cause the coils to unwind, so that the wire hoop becomes fully extended.

The panels may, be used, in various ways. For example, a panel may be used to cover the side window of an automobile (FIG. 6). In this case, the web 28 is simply placed over the top edge of the window pane, and the window is then raised to pinch the junction web and hold the panel in place.

As shown in a further embodiment in FIG. 7, the invention may also be used as a panel for collecting refuse such as cut ends of hair, or for protecting the clothing during the application of make up. In this embodiment, a panel portion 50 of annular shape has an outer peripheral sleeve 52 containing a circular spring hoop 54.

In this embodiment, there is a central opening 56 also having an inner peripheral seam 58. Typically, seam 58 will contain a length of elastic material 60. In this way, opening 56 may be stretched open and fitted over the head and around the neck of the wearer.

In order to form the panel into a generally annular trough, a plurality of generally radial straps 62—62 extend between the inner seam 58 and the outer sleeve 52. The straps have a length somewhat shorter than the radial distance between the two seams. In this way, they prevent the panel from becoming stretched out flat, and instead form it into a generally annular trough shape as shown. In the use of this embodiment, the inner opening is then stretched and placed over the head and neck of the wearer. Debris from the cutting of hair or washing or make-up of the face for example may then collect in the trough. Such an embodiment may also be of use in the health care industry, for example, by dentists and other health care operatives.

The foregoing is a description of a preferred embodiment of the invention which is given here by way of example only. The invention which is not to be taken as limited to any of the specific features as described, but comprehends all such variations thereof as come within the scope of the appended claims.

What is claimed is:

1. A self supporting storable panel system comprising;

a circular panel portion formed of flexible material, and defining a circular perimeter of predetermined diameter;

a linear strip of woven material formed of intersecting threads, bias-cut with said threads extending diagonally of said strip of said woven material, said strip having a linear dimension equal to somewhat greater than the length of said perimeter of said panel portion, said linear strip being secured around said panel portion to form a perimeter sleeve having a diameter greater than said diameter of said panel portion; and, a spring metal hoop located in said perimeter sleeve, said hoop being dimensioned to have a diameter greater than said diameter of said panel portion so as to distend said sleeve and thereby extend and stretch said panel portion, said spring hoop being resiliently collapsible, in a looped manner, into at least two adjacent connected smaller hoops, whereby said panel portion may be collapsed, for storage.

2. A self-supporting storable panel as claimed in claim 1 wherein said strip is attached to said panel portion by a first annular line of sewing, on one side of said panel portion, said strip being folded over said first annular line of sewing, and folded around said circular perimeter of said panel portion, and being attached to the other side of said panel portion by a second annular line of sewing, said second annular line of sewing being located radially inwardly with respect to said first annular line of sewing whereby to provide maximum strength.

3. A self-supporting storable panel as claimed in claim 1, including hand tab means attached to said perimeter sleeve whereby a said panel may be suspended thereby.

4. A self-supporting storable panel as claimed in claim 2 and wherein said spring metal hoop is formed of a length of spring steel having two ends and having a flattened rectangular shape in cross-section, and defining a smaller dimension t and a larger dimension T, and wherein said dimension t lies in a plane radial with respect to the panel, and wherein said larger dimension T lies in a plane normal to the plane of said panel.

5. A self-supporting storable panel as claimed in claim 4, and including a junction member formed around said two ends of said length of spring steel securing the same together and forming the same into a generally circular hoop.

* * * * *